United States Patent
Poncelet et al.

(10) Patent No.: US 6,680,066 B2
(45) Date of Patent: Jan. 20, 2004

(54) COMPOSITE MATERIAL FOR TREATING PHOTOGRAPHIC EFFLUENTS

(75) Inventors: Olivier J. Poncelet, Chalon sur Saone (FR); Danielle M. Wettling, Chatenoy le Royal (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/068,207

(22) Filed: Feb. 5, 2002

(65) Prior Publication Data

US 2002/0168596 A1 Nov. 14, 2002

(30) Foreign Application Priority Data

Mar. 14, 2001 (FR) .............................. 01 03432

(51) Int. Cl.⁷ ........................... A01N 25/08; B01J 13/00
(52) U.S. Cl. ................ 424/421; 424/409; 430/429; 514/965; 516/100; 516/110
(58) Field of Search ................. 516/100, 110; 424/408, 424, 409; 514/965

(56) References Cited

U.S. PATENT DOCUMENTS

| 4,152,404 A | * | 5/1979 | Farmer ................... 516/110 X |
| 4,995,897 A | * | 2/1991 | Schramm et al. ....... 424/421 X |
| 5,698,212 A | * | 12/1997 | Hagiwara ............... 424/421 X |
| 5,846,555 A | * | 12/1998 | Poncelet et al. ............. 424/421 |
| 5,855,899 A | * | 1/1999 | Batts et al. .................. 424/421 |
| 5,888,526 A | * | 3/1999 | Tsubai et al. ........... 424/421 X |
| 5,888,711 A |   | 3/1999 | Poncelet et al. ............. 430/527 |

FOREIGN PATENT DOCUMENTS

| EP | 0 937 393 A | 8/1999 |
| EP | 1 072 667 A | 1/2001 |
| JP | 07 047282 A | 2/1995 |

OTHER PUBLICATIONS

Wada in J. Soil Sci., 1979, 30(2), 347–355.

* cited by examiner

*Primary Examiner*—Richard D. Lovering
(74) *Attorney, Agent, or Firm*—J. Jeffrey Hawley

(57) ABSTRACT

The present invention relates to a composite material with an improved structure in which is dispersed an active organic compound, and a method for treating effluents, in particular a method for treating photographic effluents. The composite material takes the form of a structured gel comprising an aluminosilicate polymer matrix in the form of fibers in which at least two distinct fibers are interconnected by at least two covalent bonds to form an irreversible chemical gel and, dispersed in the matrix, an active organic compound. The choice of the degree of cross-linking of the matrix makes it possible to control the diffusion of a hydrophilic active organic compound. The invention further concerns a method for preparing such a composite material.

7 Claims, 5 Drawing Sheets

COMPOSITE MATERIAL FOR TREATING PHOTOGRAPHIC EFFLUENTS

FIELD OF THE INVENTION

The present invention relates to a composite material with an improved structure having dispersed therein an active organic compound, as well as to an effluent treatment process, especially a photographic effluent treatment process.

BACKGROUND OF THE INVENTION

Many manufacturing and processing steps are carried out in an aqueous phase, thereby generating aqueous effluents. One example of this is the photographic industry, in which exposed silver halide photographic films and papers pass through several aqueous processing baths. A photographic treatment generally comprises several processing baths and one or more wash and (or) stabilization baths.

These processes entail a high consumption of water. Owing to new stricter environmental legislation, new standards forbid the discarding of wastewater directly into the sewers without prior treatment, and in particular require a reduction in the consumption of water for photographic processing. The problem is that reducing the volume of water allowed favors bacterial pollution. The growth of microorganisms in aqueous solutions and in particular in prebaths, stabilization baths and wash baths is well known, and worsens as soon as the quantity of water consumed is reduced. The growth of microorganisms, if not controlled, causes the formation of sludge that clog equipment, adversely affect the process bath and so impair the quality of the resulting photographic image. In the field of traditional medical imaging, for example, it is desirable to reduce bacterial proliferation as much as possible because the bacteria cause defects on developed films. Such defects can lead to errors of diagnosis. In addition, bacterial proliferation causes the formation of a biofilm on the walls of the processing tanks and on the rollers and film drive sprockets, so that machinery has to be shut down for cleaning.

Bacterial growth control agents are commonly used to prevent or limit biological growth in processing solutions. For greater security, quantities in excess of those theoretically required are used. The result is that the wastewater discharged into the environment contains large quantities of bacterial growth control agents, which cause problems in sewage treatment centers that use the action of microorganisms to treat waste water.

Publication EP-A-937 393 describes a composite material and a method for preparing it, which comprises hydrolysing in a basic medium an alkylalkoxysilane of the formula $RSiR^1_x(OR^2)_{3-x}$ wherein R is an alkyl group comprising a SH or —S(—CH$_2$)$_n$—S— function wherein n is from 0 to 4, $R^1$ and $R^2$ are independently a methyl or ethyl group, x is 0 or 1, in the presence of an active organic compound and an aqueous solution of an inorganic imogolite gel in fiber form comprising active hydroxyl groups on the fiber surface.

The composite material obtained by this method comprises an organic-inorganic polymer matrix that is an imogolite gel in fiber form on which are grafted sulfur-containing molecules to capture the silver present in the wash water. In the matrix is dispersed an active organic compound such as a bacterial growth control agent. The composite material takes the form of a gel in which the active organic compound is trapped. When it is placed in contact with an aqueous effluent, the trapped active organic compound is slowly released into the effluent. In this material the imogolite fibers are interconnected by chemical hydrogen bonds, giving a physical gel. However, this physical gel is not dense enough to retain in its matrix the hydrophilic active organic compounds, which thus tend to diffuse too rapidly into the effluent. It is then no longer possible to control the quantity of active organic compound diffusing into the effluent. In addition, because the physical gel is thixotropic, it is relatively mobile when it is being handled, and so is difficult to package for subsequent commercialization.

The present invention provides a new material that allows a set quantity of active organic compound to be gradually released into an effluent, in particular when this active organic compound is hydrophilic.

The present invention provides also a material that is easy to package.

SUMMARY OF THE INVENTION

The present invention relates to a composite material that takes the form of a structured gel, comprising an aluminosilicate polymer matrix in the form of an imogolite gel made up of fibers, in which at least two distinct fibers are interconnected by at least two covalent bonds to form an irreversible chemical gel, and having dispersed therein an active organic compound. Owing to said covalent bonds, the material of the invention takes the form of a structured gel, and so retains the active organic compounds more effectively, especially hydrophilic compounds trapped in the matrix, thereby better controlling their diffusion out of the matrix. It is also more compact and can be packaged more easily for marketing.

The present invention further concerns a method of obtaining such a composite material. This process comprises the hydrolysis in basic medium of at least one structuring agent in the presence of an active organic compound and an aqueous solution of an inorganic imogolite gel made up of fibers comprising active hydroxyl groups on the surface, said structuring agent containing at least two leaving groups reacting with said active hydroxyl groups to form at least two covalent bonds between at least two distinct imogolite fibers to yield an irreversible chemical gel.

The term "active hydroxyl groups" here means groups able to react with the structuring agent in an aqueous medium.

The invention also relates to a method of treating a medium with said active organic compound, as well as a device for carrying out said method. This treatment method comprises contacting the composite material of the invention with said medium. The method of the invention is especially efficient for the treatment of photographic baths, in particular for releasing a set quantity of bacterial growth control agent into said baths, and especially when said control agent is hydrophilic.

DETAILED DESCRIPTION OF THE INVENTION

Figure 1:
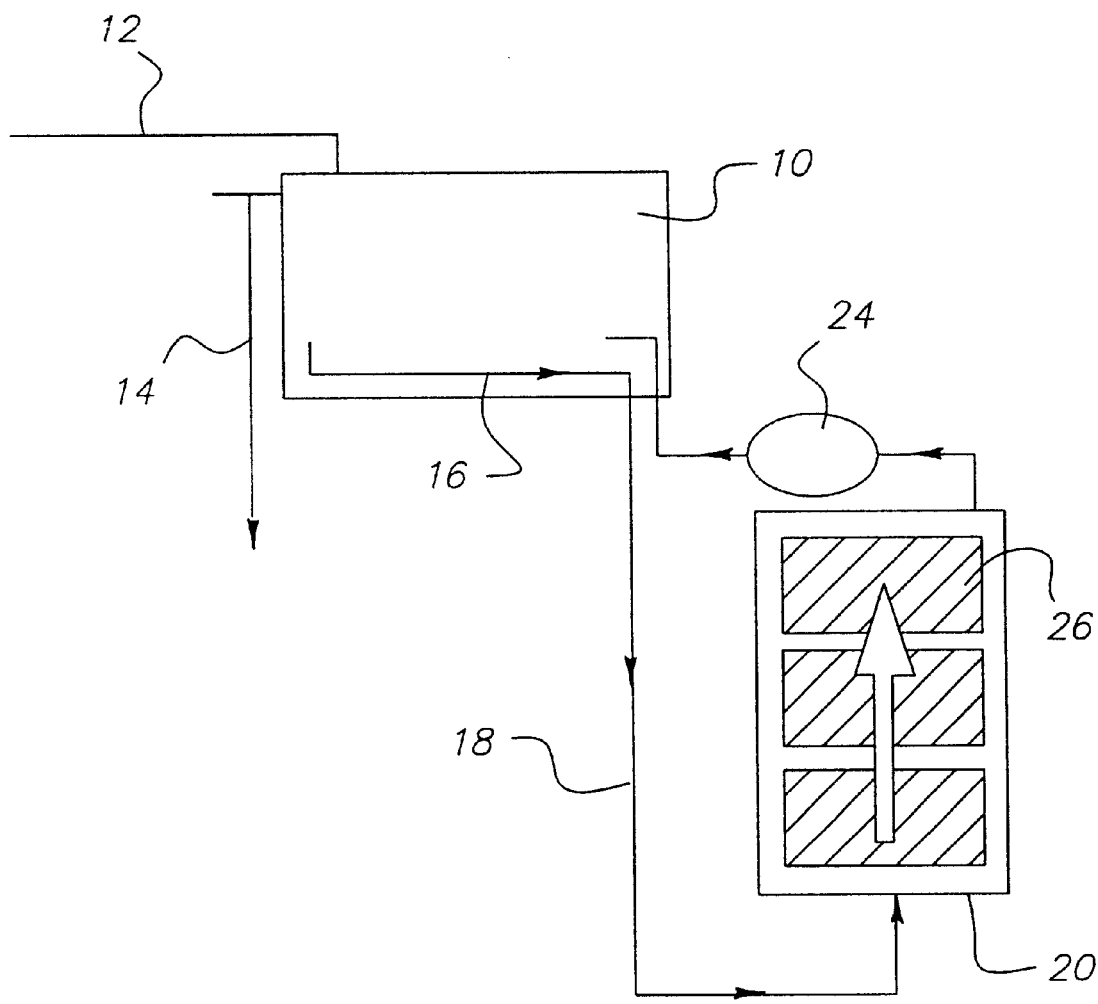
FIG. 1 is a schematic representation of an embodiment of the treatment process of the present invention applied to the treatment of a photographic processing bath.

The composite material of the invention can be obtained from any aqueous solution of aluminosilicate polymer in fiber form comprising active hydroxyl groups on the surface of the fibers.

According to a preferred embodiment, the composite material of the invention is obtained from imogolite. Imogolite is an aluminosilicate polymer that occurs in the form of fibers comprising active hydroxyl groups on their outer surface. Imogolite occurs naturally. It was first described by Wada in J. Soil Sci. 1979, 30(2), 347–355. Imogolite can be synthesized using different methods. A method of obtaining a highly pure imogolite gel is described in U.S. Pat. No. 5,888,711.

The structuring agents that are useful for the invention include at least two leaving groups hydrolyzable in basic medium, and are selected from among compounds A or A', wherein:

A has the formula $(CH_3)_nM(R)_{4-n}$ wherein M is a quadrivalent atom selected from the transition metals and elements of groups III and IV of the periodic table of the elements, and R is hydrogen, halogen, a methoxy group, an ethoxy group, an isopropoxy group, a carboxyl or acetoxy group, and n is 0, 1 or 2, and wherein the different groups R can be either identical or different.

A' has the formula $(CH_3)_nM'(R)_{3-n}$ wherein M' is a trivalent atom selected from among the transition metals and elements of groups III and IV of the periodic table of the elements, R being as defined above, and n is 0 or 1, and wherein the different groups R can be either identical or different.

Preferably, M is silicon, titanium or zirconium, and M' is aluminum or boron. The structuring agents as defined above and used in the scope of the invention are for example:

Tetramethoxysilane,
Tetraethoxysilane,
Silicon tetra-acetate,
Silicon tetrachloride,
Aluminum chloride,
Boron trichloride.

Alkoxides or chloroalkoxides of boron or aluminum can also be used.

Compounds that are sparingly soluble in water, such as tetraethoxysilane, can be mixed beforehand with ethanol.

According to the method of the invention, the structuring agent is hydrolyzed in the presence of an active organic compound and an aqueous solution of an inorganic aluminosilicate polymer in fiber form comprising hydroxyl groups on the surface of the fibers, said groups being active in aqueous solution. This hydrolysis is carried out at a pH greater than 7. Such a pH is achieved by adding a base to the reaction medium, for example $NH_4OH$, NaOH, KOH. The addition of the base to the reaction medium allows the aluminosilicate to gel.

The material obtainable by this method takes the form of a structured gel. An infrared spectrum of this gel shows that covalent O—M or O—M' bonds have been formed, wherein M and M' are as defined above.

Furthermore, the gel obtained is an irreversible chemical gel. When hydrochloric acid is added to the material obtained in order to lower the pH to below the gelling threshold of the imogolite, the composite material according to the invention retains its gel state and does not recover the initial viscosity of the imogolite, which is close to that of water.

It may be assumed that this structured gel is obtained as a result of the cross-linking of imogolite fibers by the covalent bonds irreversibly formed between them. For example, when structuring agent A is tetramethoxysilane the —OCH$_3$ leaving groups react with the hydroxyl groups of the aluminosilicate to form stable O—Si covalent bonds, yielding a multitude of bridges composed of —O—Si—O— chains between at least two distinct imogolite fibers, thereby forming a dense structured network. Structuring agents that possess three or four hydrolyzable leaving groups have the highest potential structuring power because covalent bonds can be formed in three dimensions. The same reasoning can be applied to a structuring agent A', which yields, for example, —O—Al—O— or —O—B—O— bridges. This hydrolysis reaction is accompanied by the gelling of the aluminosilicate, during which the active organic compound is trapped in the matrix of the structured network. An irreversible chemical gel is thereby obtained, which constitutes the composite material of the present invention. When the composite material of the invention is placed in contact with an aqueous effluent, the trapped active organic compound will be released at a rate that will depend on how strongly it is retained by the matrix or structured network.

To obtain a particularly dense structured composite material, tetramethoxysilane will be preferably selected, because its four methoxy leaving groups hydrolyze to form four covalent O—Si bonds from a single Si atom, to yield —O—Si—O— bridges between at least two imogolite fibers.

The density of the network can be adapted according to the functions of the structuring agent selected, but depends also on the amount of structuring agent used. The concentration of structuring agent, as defined above, is preferably less than 10% by weight of the [Al+Si] content of the imogolite. This percentage affords a gel that is sufficiently compact, while still allowing the active organic compound to diffuse.

The active organic compound used in the present invention is an organic compound that is soluble in the effluent to be treated, and which does not form covalent bonds with the matrix, otherwise it would stay trapped in the material.

According to one embodiment, the active organic compound is a hydrophilic bacterial growth control agent. In this case the composite material of the present invention reduces or halts the growth of micro-organisms in an effluent while avoiding the discharge into the environment of large amounts of bacterial growth control agent. Clearly, the hydrophilic bacterial growth control agent can be used with a hydrophobic control agent, which is less sensitive to the problem of too rapid diffusion in an aqueous effluent.

This bacterial growth control agent can be a pesticide, an algicide, a fungicide or a bactericide. In the scope of the invention, a hydrophilic bacterial growth control agent is defined as any control agent with a water solubility of more than 1,000 ppm. Conversely, a hydrophobic control agent has a water solubility less than or equal to 1,000 ppm.

A large number of hydrophilic or hydrophobic bacterial growth control agents are known to prior art. From general knowledge, those skilled in the art can easily select a hydrophilic bacterial growth control agent and a hydrophobic bacterial growth agent to obtain the composite material of the invention.

The hydrophilic, and when appropriate the hydrophobic bacterial growth control agents that are useful for the invention can be selected for example from among thiazole derivatives such as isothiazolones, azole derivatives such as benzotriazoles and benzimidazoles, sulfamide-type agents such as sulfanilamide, organoarsenides such as 10-10'-oxybis-phenoxyarsine, benzoic acid, sorbic acid, benzalkonium quaternary ammonium salts, nitro-alcohols, quaternary ammonium salts of formula $R_5(R_6)N^1(R_7)R_8X^-$ in which $R_5$, $R_6$, $R_7$, and $R_8$ are independently aliphatic, heterocyclic or carboxylic radicals and $X^-$ is a monovalent anion, and alkyl-amphoacetates. These derivatives can comprise substituents to make the derivative either hydrophilic or hydrophobic.

The substituents that afford hydrophilic bacterial growth control agents are for example lower alkyl groups preferably containing 1 to 3 atoms of carbon, halogens, or a hydroxyl group.

The substituents that afford hydrophobic bacterial growth control agents are for example alkyl groups with more than 3 carbon atoms, branched alkyl groups with more than 4 carbon atoms, straight or branched-chain fluoroalkyl groups with an alkyl radical containing more than 3 atoms of carbon, and perfluoroalkyl groups with a straight or branched-chain alkyl group containing more than 3 carbon atoms.

According to a preferred embodiment, the mixture of bacterial growth control agents includes at least one control agent of the hydrophilic isothiazolone type and at least one control agent of the hydrophobic isothiazolone type.

The isothiazolones can be represented by the formula:

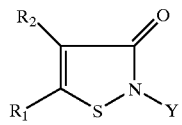

wherein Y is a hydrogen atom, a substituted or unsubstituted alkyl or cycloalkyl group, a substituted or unsubstituted alkenyl group or a substituted or unsubstituted alkynyl group, $R^1$ and $R^2$ are independently a hydrogen atom, a halogen atom or an alkyl group, or $R^1$ and $R^2$ together form a benzene moiety.

Preferably, when the bacterial growth control agent is a hydrophilic control agent, Y is either methyl or ethyl, and $R^1$ and $R^2$ are chloride, methyl or ethyl. When the bacterial growth control agent is a hydrophobic control agent, Y is for example an octyl group, and $R^1$ and $R^2$ are alkyl groups with more than 3 carbon atoms.

For example the hydrophilic isothiazolones can be 1,2-benzisothiazolin-3-one, 2-methyl-4-isothiazolin-3-one, and 5-chloro-2-methyl-4-isothiazolin-3-one.

For example the hydrophobic isothiazolones can be 2-octyl-4-isothiazolin-3-one, 4,5-dichloro-2-N-octyl-4-isothiazolin-3-one.

The quantity of bacterial growth control agents that can be dispersed in the matrix varies widely according to the mixture of control agents, the solution to be treated, the possible extent of contamination by micro-organisms, and for how long the growth of micro-organisms is to be limited. The molar ratio of the inorganic matrix to the mixture of bacterial growth control agents can be between 10:1 and 1:200. The hydrophobic bacterial growth control agents can represent at least 50% by weight calculated relative to the total quantity of bacterial growth control agents.

According to one embodiment, the active organic compound dispersed in the matrix is a complexing agent that is released to form a complex salt with silver contained in a medium to be treated. The medium can be a photographic bath, and the complexing agent complexes the silver present when it is released into the photographic bath, in order to avoid the accumulation of metallic silver in the form of silver-laden slurries in the bath. Suitable complexing agents include thiols and in particular heterocyclic thiols, for example mercaptobenzimidazoles, mercaptobenzothiazoles, triazole-thiols, mercaptotetrazoles, imidazoline-thiones, mercaptocarboxylic acids, and mercaptobenzoxazoles. For example, it is possible to incorporate between 10 g and 300 g of thiol per kg of aluminosilicate polymer gel containing 3 g Al+Si per liter. The quantity of thiol that can be incorporated in the polymer gel depends on its texture and so on the quantity of Al+Si per liter.

As seen above, the composite material according to the invention forms a network of ranging density according to the choice and quantity of the structuring agent used. Thus when the active organic compound used is a bacterial growth control agent that is highly water-soluble, tetramethoxysilane will be preferably chosen; this affords a highly structured inorganic matrix that prevents rapid diffusion of said bacterial growth control agent in the effluent. The efficient quantity of structuring agent, as defined above, that yields a sufficiently compact gel that still allows the diffusion of bacterial growth control agents depends also on the control agent itself. Thus when the control agent is hydrophobic and so tends to remain in the inorganic matrix, an amount equal to 1% by weight of structuring agent, as defined above, relative to the [Al+Si] content of the imogolite is sufficient to obtain a compact gel. When the control agent is hydrophilic and so has a greater tendency to diffuse out of the matrix, an amount equal to 5% by weight of structuring agent, as defined above, relative to the [Al+Si] content of the imogolite, can be used to achieve a good compromise between the gel structure of the composite material and the kinetics of diffusion of the bacterial growth control agent. When it is desired only to reduce the thixotropic character of the gel to improve its packagability, a very small amount of structuring agent (less than 1% by weight relative to the [Al+Si] content of the imogolite) can be used without modifying the diffusion characteristics of the bacterial growth control agents.

The formulation of the composite material according to the invention thus affords perfect control over the diffusion of species that are highly soluble in the effluent. Consequently, it is possible to use bacterial growth control agents that are highly water-soluble, which could not be used hitherto because they diffused too rapidly. The range of bacterial growth control agents that can be used in the composite material of the invention is thus broadened, making it easier to adapt the composite material to comply with different environmental regulations.

In order to carry out the effluent treatment process of the invention it is necessary to optimize the contact between the composite material of the invention and the effluent to be treated.

The composite material of the present invention takes the form of a structured gel, is compact and can be easily packaged for commercialization. The compact gel can be easily placed in a container that is permeable to the effluent, e.g., a dialysis bag, a non-woven material, etc. The device that allows to carry out of the treatment process can be adapted according to the needs of the user. For example, when a curative effect is especially sought (in cases of poor water quality and (or) heavily soiled treatment apparatus), highly water-soluble bacterial growth control agents have to be used. In this situation a very compact composite material according to the invention will be placed in the treatment device, so as to deliver a perfectly controlled amount of hydrophilic bacterial growth control agent.

This process can be advantageously used in a photographic processing method that comprises passing a photographic material through a series of processing baths between which are intercalated washing and (or) stabilization baths, these baths being treated with the treatment process of the invention.

When the active organic compound is a bacterial growth control agent the composite material can be used in any application in which the bacteriological quality of water has to be controlled. In the photographic sector, for example, the composite material of the invention can be preferably used for the treatment of a washing bath.

FIG. 1 shows an embodiment of the treatment process of the present invention applied to the treatment of a photographic bath.

In this figure a tank 10, which can be a processing tank of a photographic processing machine, is supplied with water through the piping 12. This tank 10 is fitted with an overflow 14 that allows the volume of solution held in the tank 10 to be kept constant. The tank is also fitted with an outlet 16 connected by piping 18 to a treatment device 20 containing the composite material of the invention, in which the active organic material is a mixture of hydrophilic and hydrophobic bacterial growth control agents. The treatment device 20 is connected to a pump 24 that sends the treated solution back to the tank 10. The treatment device 20 can comprise several treatment units 26. In the specific embodiment of FIG. 1 the treatment device 20 comprises three treatment units 26.

According to a specific embodiment at least two units contain the composite material according to the invention. The third unit can contain a material of a different nature, for example a material designed to trap compounds to be eliminated from the solution. For example the third unit can contain a material that can trap silver contained in the solution to be treated.

According to a specific embodiment each unit can be replaced independently of the others.

The solution to be treated that is liable to harbor bacteria flows through the treatment device 20 that contains at least one treatment unit containing the composite material of the invention. By flowing through this material the solution takes up bacterial growth control agents. This solution containing bacterial growth control agents is then sent to the treatment tank 10. Bacterial growth in the solution can thereby be limited. The composite material is formulated according to the hydrophilicity of the bacterial growth control agents in such a way as to achieve full control over the diffusion of these hydrophilic bacterial growth control agents.

The following examples illustrate the present invention in detail.

EXAMPLE 1

Preparation of an aqueous solution of imogolite.

The aluminosilicate of this example was prepared using teachings from Patent Application WO 96/13459.

To 1,000 ml of de-ionized water were added 16.7 mmoles of tetraethylorthosilicate $Si(OC_2H_5)_4$. The reaction mixture was stirred at ambient temperature for one hour and the solution was then added to 31.2 mmoles of $AlCl_3.6H_2O$ dissolved in 1,000 ml of pure water. The mixture was stirred for 20 minutes and the pH was adjusted to 4.5 with 1 M NaOH. The solution became cloudy. When the solution became transparent again, 1 M NaOH was added until the pH reached 6.8. A white gel was obtained, which was centrifuged for 20 minutes at 2,000 rpm. This gel was collected and redissolved in 5 ml of a mixture of 1 M HCl and 2 M acetic acid. The volume was made up to 2 l with water. The solution contained 30 mmoles of Al, 16.6 mmoles of Si, 5 mmoles of HCl and 10 mmoles of acetic acid. This solution was stored at 5° C.

This solution was then diluted in de-ionized water to obtain a concentration of Al of 10 mmoles/l. The diluted solution was heated for 5 days at 96° C. and then filtered through an ultrafiltration membrane with a separating power of 10,000 Daltons (membrane manufactured by AMICON). A clear solution was obtained containing Al and Si in the Al:Si ratio of 1.8 with an [Al+Si] content of 2 g/l.

EXAMPLE 2

(Invention)

Preparation of the composite material with tetramethoxylsilane as structuring agent, the active organic compound being a bacteriological growth control agent.

a) A gel containing Kathon 287T®, a hydrophobic bacterial growth control agent supplied by Rohm & Haas was prepared according to the following operating procedure.

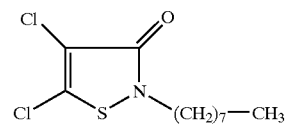

Kathon 287T®

40 g of pure Kathon 287T® was dissolved with strong stirring in 80 ml of methanol at 50° C. After complete dissolution, 20 ml of tetramethoxysilane was added with stirring, i.e., 10% by weight relative to the [Al+Si] content of the imogolite. To this mixture was added 100 ml of a 2 g/l solution of imogolite prepared using the operating procedure of Example 1. The addition was made rapidly using an 'Ultraturax' emulsifier-homogenizer to obtain a homogeneous dispersion. 100 ml of imogolite was then added with mechanical stirring. The mixture was then cooled with stirring. When the temperature reached 25° C. ammonia $NH_4OH$ (8.4 ml) was added to obtain a compact cross-linked gel containing the imogolite in the form of an aqueous gel in which the hydrophobic Kathon 287T® is dispersed.

b) A gel containing Kathon LX®, a mixture of hydrophilic bacterial growth control agents that are completely soluble in water, supplied by Rohm & Haas, was prepared according to the following operating procedure. Kathon LX®: aqueous solution containing 13.7% by weight of isothiazolones of formula:

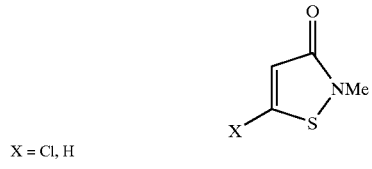

X = Cl, H in which the chloroisothiazolone:isothiazolone ratio is 3:1.

2 ml of Kathon LX® was mixed with 1 ml of methanol with magnetic stirring, and 10 ml of tetramethoxysilane was then added (i.e., 10% be weight relative to the [Al+Si] content of the imogolite). This mixture was added to 100 ml of a 2 g/l solution of imogolite. Addition of the mixture of Kathon LX® and tetramethoxysilane to the imogolite was carried out with slow mechanical stirring at ambient temperature. Ammonia was then added (0.4 ml). As soon as a gel mass appeared the stirring was stopped. After a few minutes a compact cross-linked gel was obtained.

(c) The composite material of the invention was obtained by mixing, with very slow mechanical stirring, the gel a) prepared above in which was dispersed Kathon 287T® (water solubility 5 mg/l) and gel b) prepared above in which was dispersed Kathon LX®. The proportion was 1/3 of gel containing Kathon LX® to 2/3 of gel containing Kathon 287T®.

To show that the imogolite was cross-linked and that the composite material of the invention was composed of an irreversible chemical gel, the following experiment was conducted : to a physical imogolite gel obtained according to Example 1 was added 3 ml of HCl (37%) to lower its pH to 3, below the gelling threshold. The imogolite reverted to its initial homogeneous liquid state with a viscosity close to that of water. When this experiment was carried out with the composite material of the invention, the latter retained its gel state owing to the irreversible formation of covalent bonds between the imogolite fibers.

EXAMPLE 3

(Comparative)

A gel containing Kathon 287® was prepared as in step a) of Example 2, but without adding tetramethoxysilane.

A gel containing Kathon LX® was prepared as in step b) of Example 2 but without adding tetramethoxysilane.

A mixture of 1/3 of the gel obtained containing Kathon LX® and 2/3 of the gel obtained containing Kathon 287T® was made up. A non-compact, relatively mobile gel was obtained that lost water.

EXAMPLE 4

In two dialysis bags (Nadir, cellulose tube with pore size 2.5–3.0 nanometers, supplied by ROTH) were placed two 10 g samples of the composite material prepared according to Example 2 (tests A and B). In another dialysis bag was placed 10 g of a mixture of gels prepared according to Example 3, i.e., without tetramethoxysilane (test C).

Each bag was immersed in 400 ml of osmosed water. At regular intervals (every 30 minutes) the osmosed water was replenished. The recovered water was analyzed by UV-visible spectrophotometry. The optical density measured is characteristic of the quantity of bacterial growth control agent present in the osmosed water. A wavelength of 274 nm is characteristic of Kathon LX®, a wavelength of 280 nm is characteristic of Kathon 287T®, and an intermediate wavelength is characteristic of a mixture of Kathon LX® and Kathon 287T®. The diffusion of Kathon LX® alone was followed, because the absorption peak of Kathon 287T® was too close and too weak to be measured, being partly obscured by the absorption peak of Kathon LX®. Calibration using solutions of known concentrations of Kathon LX® allowed the relation between optical density and concentration to be determined, so that the concentration of Kathon LX® diffused in the osmosed water could be obtained from the optical density of the latter.

The results are reported in Table 1 below and represented diagrammatically in FIG. 2.

TABLE I

| | Concentration of Kathon LX ® (mg/l) | | |
|---|---|---|---|
| Change of water | Test A (inv.) | Test B (inv.) | Test C (control) |
| 1 | 2.35 | 1.93 | 5.34 |
| 2 | 1.33 | 1 | 3.34 |
| 3 | 0.93 | 0.62 | 2.02 |

Figure 2:
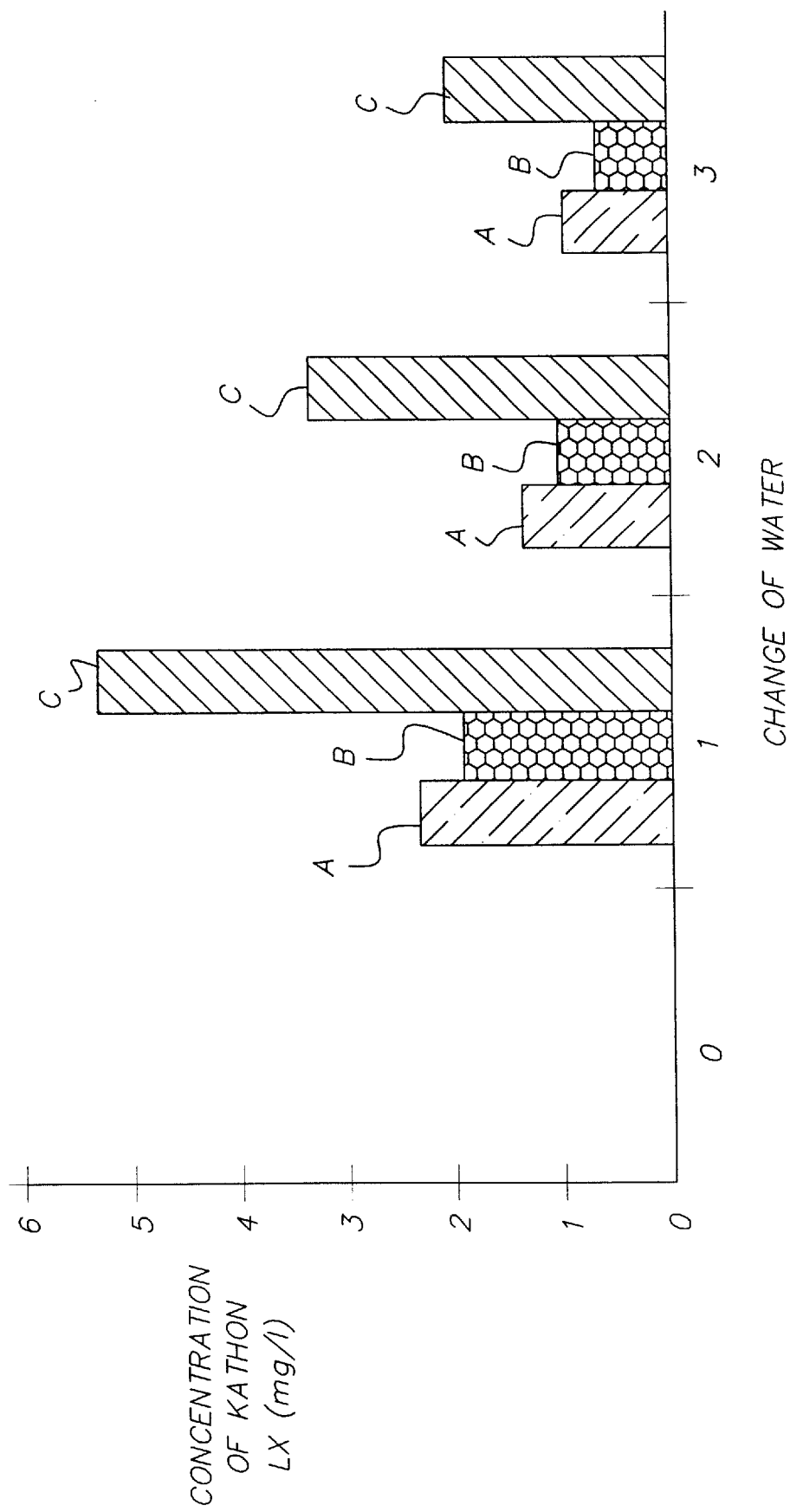
FIGS. 2 to 5 illustrate the examples of implementation of the invention.
Figure 3:
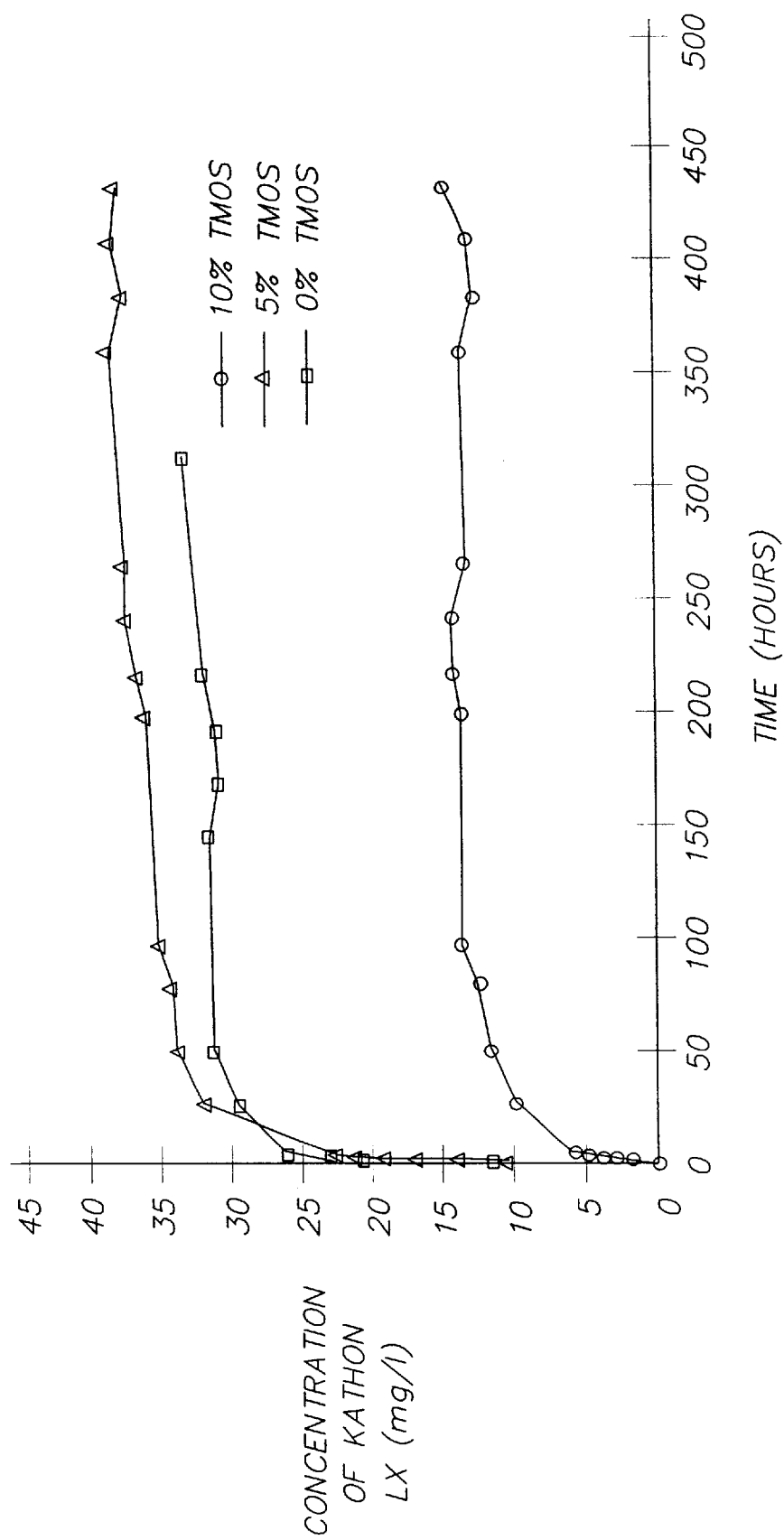

Table 1 and FIG. 2 show that the concentration of Kathon LX® that diffused into the osmosed water was much lower when the Kathon LX® was dispersed in the cross-linked imogolite matrix. The composite material of the invention, composed of a cross-linked gel, allows a much slower diffusion of the hydrophilic bacterial growth control agent than a non-cross-linked imogolite gel. The composite material is sufficiently compact for packaging and to ensure a delayed diffusion of the hydrophilic bacterial growth control agent, but without excessively slowing the diffusion of the hydrophilic bacterial growth control agent.

As a result, the diffuser containing the composite material will remain efficacious for longer and will allow control over the rate of diffusion of bacterial growth control agents, in particular of the hydrophilic control agent, so that it can be adapted to particular cases when necessary by appropriate formulation of the composite material.

EXAMPLE 5

The synthesis of various composite materials was carried out according to Example 2 but with a modified tetramethoxysilane content, so as to have 5% and 10% of tetramethoxysilane relative to the [Al+Si] content of the imogolite. The diffusion of the bacterial growth control agents from these cross-linked composite materials was compared with that from the physical gel without tetramethoxysilane obtained according to Example 3.

For each composition 10 g of gel was placed in a dialysis bag, which was placed in 400 ml of osmosed water. The time course of the continuous diffusion of the active Kathon LX® was followed by UV-visible spectrophotometry. The results are reported in Table 1 below and represented diagrammatically in FIG. 3.

TABLE II

| | Concentrations of Kathon LX ® (mg/l) for an imogolite gel with | | |
|---|---|---|---|
| Time (hours) | 10% tetramethoxysilane | 5% tetramethoxysilane | 0% tetramethoxysilane |
| 0 | 0 | 0 | 0 |
| 0.5 | 1.88 | 11.63 | 10.79 |
| 1 | 2.97 | 16.83 | 14.21 |
| 1.5 | 3.83 | 20.82 | 16.98 |
| 2 | 4.68 | 23 | 19.27 |
| 2.5 | 5.20 | | 21.32 |
| 3 | 5.97 | 26.19 | 22.62 |
| 24 | 9.85 | 29.48 | 32.11 |
| 48 | 11.49 | 31.30 | 33.99 |
| 78 | 12.28 | | 34.5 |
| 96 | 13.48 | | 35.19 |
| 144 | | 31.56 | |
| 168 | | 31.10 | |
| 192 | | 30.96 | |
| 198 | 13.54 | | 36.21 |
| 216 | 13.96 | 31.99 | 36.66 |
| 240 | 14.10 | | 37.41 |
| 264 | 13.40 | | 37.50 |
| 312 | | 32.98 | |
| 360 | 13.28 | | 38.58 |
| 384 | 12.28 | | 37.63 |
| 408 | 12.67 | | 38.42 |
| 432 | 14.22 | | 38.01 |

Table II and FIG. 3 show that the concentration of Kathon LX® that diffused into the osmosed water in time was lower when an imogolite gel cross-linked with tetramethoxysilane (TMOS) was used, in particular when the TMOS content was equal to 10% relative to the [Al+Si] content of the imogolite. The more tetramethoxysilane there was in the composite material the more slowly did the hydrophilic bacterial growth control agent Kathon LX® diffuse into the osmosed water. This is because the more cross-linked and denser the composite material is, the more strongly the hydrophilic control agent trapped in the inorganic matrix is retained.

EXAMPLE 6

The synthesis of two cross-linked gels was carried out according to steps a) and b) of Example 2 respectively, but varying the tetramethoxysilane content to obtain 1%, 2%, 5% and 10% by weight of tetramethoxysilane relative to the [Al+Si] content of the imogolite.

For each composition 10 g of gel was placed in a dialysis bag, which was immersed in 400 ml of osmosed water The continuous diffusion from the gels containing only Kathon LX®, and that from the gels containing only Kathon 287T® was monitored by UV-visible spectrophotometry.

The results are reported in Tables III and IV below and represented diagrammatically in FIGS. 4 and 5.

TABLE III

| | Concentration of Kathon LX ® (mg/l) for an imogolite gel with | |
|---|---|---|
| Time (hours) | 5% tetramethoxysilane | 10% tetramethoxysilane |
| 0 | 0 | 0 |
| 0.5 | 11.63 | 9.06 |
| 1 | 16.83 | 11.49 |
| 1.5 | 20.82 | |
| 2 | 23 | 16.98 |
| 3 | 26.19 | 18.29 |
| 24 | 29.48 | 25.71 |
| 48 | 31.30 | 27.57 |
| 144 | 31.56 | 28.78 |
| 168 | 31.10 | 29.26 |
| 192 | 30.96 | 28.62 |
| 198 | | |
| 216 | 31.99 | |
| 240 | | |
| 264 | | |
| 312 | 32.98 | |

TABLE IV

| Time | Concentration of Kathon 287T ® (mg/l) for an imogolite gel with | | | |
|---|---|---|---|---|
| in hours | 1% tetramethoxysilane | 2% tetramethoxysilane | 5% tetramethoxysilane | 10% tetramethoxysilane |
| 0.5 | 2.87 | 2.51 | 2.21 | 1.02 |
| 1 | 3.06 | 2.81 | 2.4 | 1.14 |
| 1.5 | 3.23 | 2.98 | 2.59 | 1.27 |
| 2 | 3.31 | 2.99 | 2.62 | 1.38 |
| 3 | 3.64 | 3.16 | 2.73 | 1.68 |
| 24 | 4.37 | 4.06 | 3.51 | 2.26 |
| 48 | 4.76 | 4.33 | 4.26 | |
| 144 | 5.66 | 5.3 | 4.62 | 4.38 |
| 168 | 6.87 | 6.36 | 5.65 | 5.55 |
| 192 | 7.42 | 7.1 | 6.36 | 6.18 |
| 216 | 7.87 | 7.64 | 6.82 | 6.41 |
| 312 | 7.97 | 7.69 | 6.97 | 6.79 |

Figure 4:
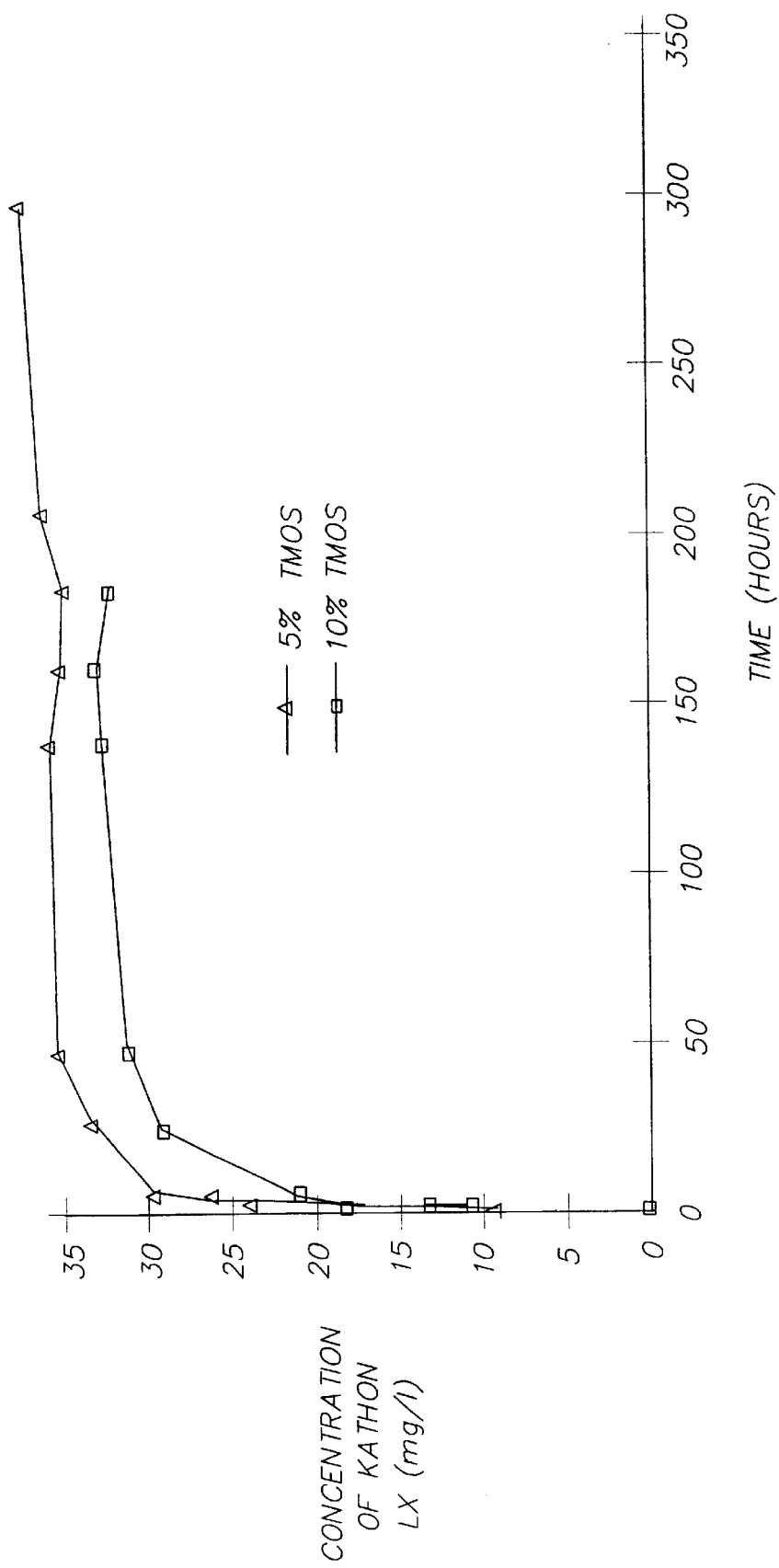
Figure 5:
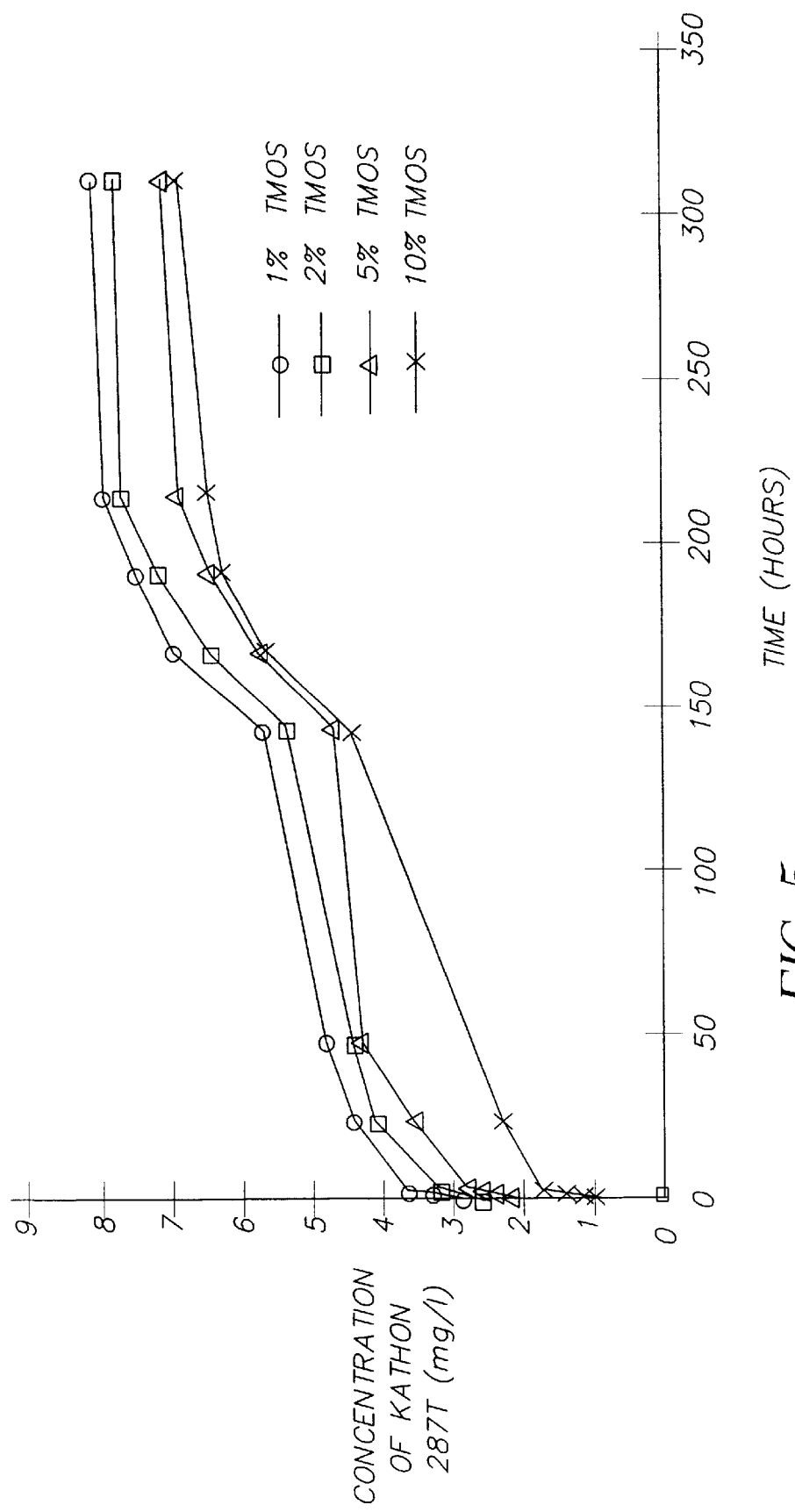

Table III and FIG. 4 show that to obtain a good compromise between gel structure and diffusion kinetics the gel containing Kathon LX® alone is not sufficiently structured when the tetramethoxysilane content is below 5% by weight relative to the [Al+Si] content of the imogolite. However, Table IV and FIG. 5 show that the gel containing Kathon 287T® alone and 1% by weight of tetramethoxysilane relative to the [Al+Si] content of the imogolite is sufficiently cross-linked to achieve a good compromise between gel structure and diffusion kinetics. The composite material of the invention can therefore be formulated by varying the tetramethoxysilane content to adapt it best to the bacterial growth control agents used.

| PART LIST | |
|---|---|
| 10 | Tank |
| 12 | Piping |
| 14 | Overflow |
| 16 | Outlet |
| 18 | Piping |
| 20 | Treatment device |
| 24 | Pump |
| 26 | Treatment units |

What is claimed is:

1. A composite material in the form of a structured gel comprising an aluminosilicate polymer matrix in the form of an imogolite gel made up of fibers in which at least two distinct fibers are interconnected by at least two covalent bonds to form an irreversible chemical gel and, dispersed in the matrix, an active organic compound.

2. The material according to claim 1, wherein the active organic compound is hydrophilic.

3. The material according to claim 1, wherein said covalent bonds are O—M or O—M' bonds where M and M' are respectively a quadrivalent atom and a trivalent atom selected from the group consisting of the transition metals and the elements of groups III and IV of the periodic table of the elements.

4. The material according to claim 3, wherein M is selected from the group consisting of silicon, titanium and zirconium, and M' is selected from the group consisting of aluminum and boron.

5. The material according to claim 1, wherein the active organic compound is a bacterial growth control agent.

6. The material according to claim 5, wherein the bacterial growth control agent is selected from the group consisting of thiazole, azole, sulfamide and organoarsenide derivatives, benzoic acid, sorbic acid, benzalkonium quaternary ammonium salts and nitroalcohols.

7. The material according to claim 6 wherein the active compound is a mixture of bacterial growth control agents comprising at least one hydrophilic control agent and at least one hydrophobic control agent, said control agents being selected from the group consisting of the isothiazolones.

* * * * *